(12) United States Patent
Kilpeläinen et al.

(10) Patent No.: US 10,530,214 B2
(45) Date of Patent: Jan. 7, 2020

(54) STATOR FRAME OF AN ELECTRICAL MACHINE AND AN ELECTRICAL MACHINE

(71) Applicant: ABB Schweiz AG, Baden (CH)

(72) Inventors: Toni Kilpeläinen, Helsinki (FI); Aleksi Kinnunen, Helsinki (FI); Jani Kosonen, Helsinki (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/189,160

(22) Filed: Nov. 13, 2018

(65) Prior Publication Data

US 2019/0081531 A1  Mar. 14, 2019

Related U.S. Application Data

(63) Continuation of application No. PCT/EP2017/061026, filed on May 9, 2017.

(30) Foreign Application Priority Data

May 10, 2016 (CN) .......................... 2016 1 0304374

(51) Int. Cl.
*H02K 5/20* (2006.01)
*H02K 5/24* (2006.01)
(Continued)

(52) U.S. Cl.
CPC ............... *H02K 5/20* (2013.01); *H02K 1/185* (2013.01); *H02K 5/24* (2013.01); *H02K 9/19* (2013.01)

(58) Field of Classification Search
CPC .. H02K 9/18; H02K 9/19; H02K 5/18; H02K 5/20
See application file for complete search history.

(56) References Cited

U.S. PATENT DOCUMENTS 3,521,094 A * 7/1970 Widder .................. H02K 9/19
310/58
5,185,544 A * 2/1993 Takada ................... H02K 9/26
310/157
(Continued)

FOREIGN PATENT DOCUMENTS

DE 19652706 A1 6/1997
DE 19808602 C1 9/1999
(Continued)

OTHER PUBLICATIONS

European Patent Office, International Search Report & Written Opinion issued in corresponding Application No. PCT/EP2017/061026, dated Jul. 21, 2017, 10 pp.

*Primary Examiner* — Dang D Le

(74) *Attorney, Agent, or Firm* — Taft Stettinius & Hollister LLP; J. Bruce Schelkopf

(57) ABSTRACT

The application relates to a stator frame of an electrical machine having a first end and a second opposite end. A flange is protruding from the first end and surrounding the first end. The stator frame includes cooling fluid channels and cooling fins on the outer surface of the stator frame extending from the first end to the second end. The stator frame is formed as a single piece. The ends of the outer walls of the cooling fluid channels in the first end are connected to the flange and the cooling fins extend to the junction of the flange and the first end.

17 Claims, 1 Drawing Sheet

(51) Int. Cl.
*H02K 1/18* (2006.01)
*H02K 9/19* (2006.01)

(56) References Cited

U.S. PATENT DOCUMENTS

| | | | |
|---|---|---|---|
| 5,616,973 | A | 4/1997 | Khazanov et al. |
| 5,925,947 | A * | 7/1999 | Kajiwara ................. H02K 9/18 |
| | | | 310/58 |
| 6,011,335 | A * | 1/2000 | Belley ...................... H02K 5/06 |
| | | | 310/418 |
| 6,146,113 | A | 11/2000 | Fassnacht et al. |
| 6,322,332 | B1 | 11/2001 | Jensen et al. |
| 6,329,731 | B1 * | 12/2001 | Arbanas .............. F16H 57/0416 |
| | | | 310/52 |
| 2013/0300229 | A1 * | 11/2013 | Muller ..................... H02K 5/20 |
| | | | 310/54 |
| 2014/0166844 | A1 | 6/2014 | Lyle et al. |

FOREIGN PATENT DOCUMENTS

| | | | |
|---|---|---|---|
| EP | 1523085 | A2 | 4/2005 |
| EP | 2369723 | A2 | 9/2011 |

\* cited by examiner

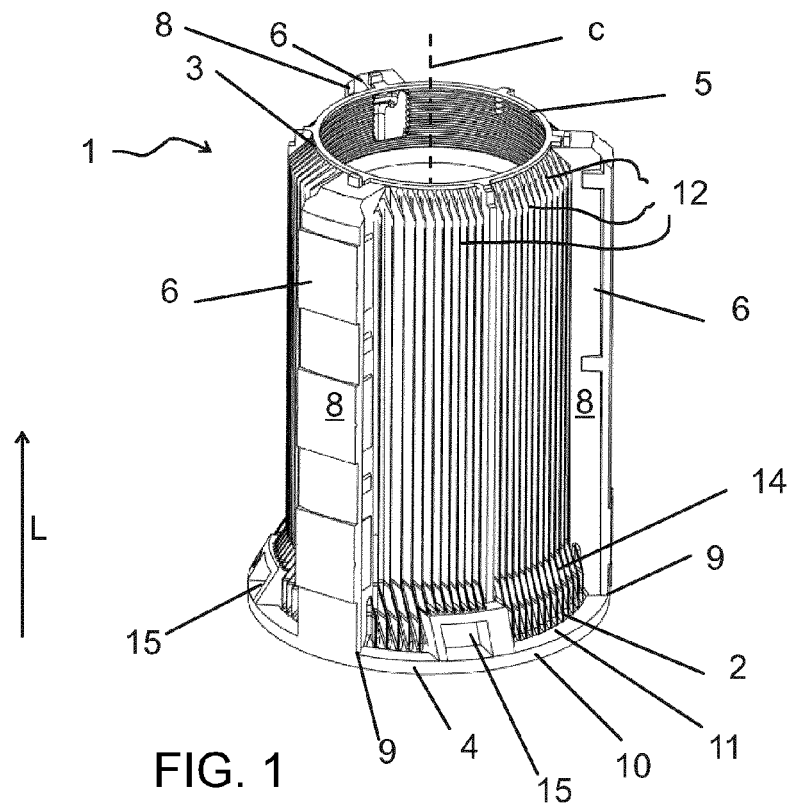
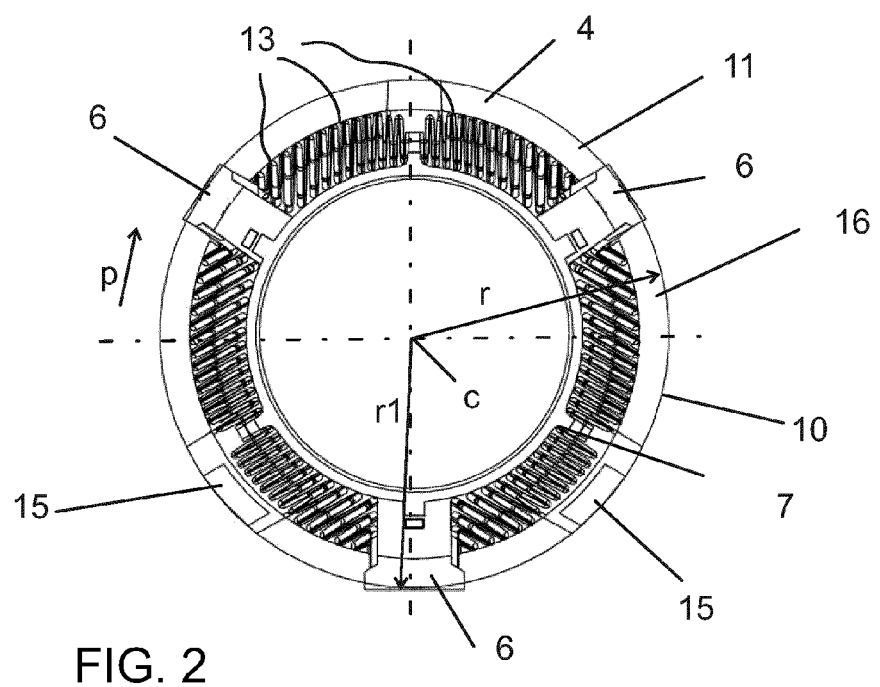

STATOR FRAME OF AN ELECTRICAL MACHINE AND AN ELECTRICAL MACHINE

FIELD OF THE INVENTION

The invention relates to a stator frame of an electrical machine and more particularly to a stator frame of an electrical machine capable of reducing vibrations.

BACKGROUND OF THE INVENTION

In an electrical machine the uneven distribution of rotor mass around an axis of rotation causes a moment which gives the rotor a wobbling movement characteristic of vibration. This rotor mass unbalance excites elliptical whirling of the shaft of the rotor and limits the designing especially in large electrical machines.

A common solution for reducing vibrations is to use vibration dampers.

The drawback with the previous solutions for reducing vibrations originating from a rotor mass unbalance is a considerable effort and expense to manufacture, to assemble and to service the damping systems.

BRIEF DESCRIPTION OF THE INVENTION

An object of the present invention is to solve the above mentioned drawbacks and to provide a simple and efficient solution for reducing vibration and whirl of a shaft of a rotor of an electrical machine.

This object is achieved with a stator frame of an electrical machine according to independent claim 1.

A stator frame of an electrical machine has a first end and a second opposite end and a flange protruding from the first end and surrounding the first end. The stator frame has cooling fluid channels and cooling fins on the outer surface of the stator frame extending from the first end to the second end. The stator frame is formed as a single piece. The ends of the outer walls of the cooling fluid channels in the first end are connected to the flange. The cooling fins extend to the junction of the flange and the first end. An advantage of the invention is that it increases stiffness to frame and thus reduces the effort and expense to manufacture, to assemble and to service the otherwise required damping systems.

The preferred embodiments of the invention are disclosed in the dependent claims.

BRIEF DESCRIPTION OF THE DRAWINGS

In the following the invention will be described in greater detail by means of preferred embodiments with reference to the accompanying drawings, in which FIG. 1 shows an isometric view of a stator frame of an electrical machine;

FIG. 2 shows a top view of a stator frame of an electrical machine.

DETAILED DESCRIPTION OF THE INVENTION

FIG. 1 shows an isometric view of a stator frame of an electrical ma-chine and FIG. 2 shows a top view of a stator frame of an electrical machine.

The stator frame has a first end 2 and a second 3 opposite end. From the first end 2 protrudes a flange 4 in the radial direction r of the frame 1 surrounding the first end 2. The flange 4 is a continuous part of the frame 1 which means that it strengthens the frame 1 and gives structural stiffness to the frame 1. The second end 3 comprises a circular opening 5 of a cylinder end, for instance.

The stator frame 1 comprises cooling fluid channels 6 protruding from the outer surface 7 of the stator frame 1 in the radial direction r of the frame 1. The outer surface 7 of the cylindrical stator frame 1 form the inner walls of the cooling fluid channels 6. The inlets and outlets for the cooling fluid in the cooling channels 6 may be formed as openings to the stator frame 1 and positioned towards the first end 2 and the second end 3 of the frame 1. The ends 9 of the outer walls 8 of the cooling fluid channels 6 in the first end 2 of the frame 1 are connected to the upper surface 16 of the flange 4. The junctions between the flange 4 and the ends 9 of the cooling fluid channels are 6 capable of transferring axial forces and torque as the cooling channels 6 are a continuous part of the flange 4 and the stator frame 1.

The cooling fluid channel 6 may comprise a substantially rectangular cross section. In order to increase to stiffening effect of the cooling fluid channels 6 the thickness of the outer walls of the cooling fluid channels can be increased towards the first end 2 in a length direction L of the frame 1.

The outer walls 8 of the cooling fluid channels 6 aligned in the length direction L of the frame 1 provide torsional stiffness. The radially outmost part of the outer wall 8 may be positioned to the outer rim area 11 of the flange 4 on the upper surface 16 of the flange 4 whereby wall's 8 stiffening effect is increased. The outer rim area 11 is close to the edge 10 of the flange 4.

Further, it is possible to fix the radial distance r1 from the centre line c of the stator frame 1 to the edge 10 of the flange 4 and to the radially outmost part of the cooling channel 6 to be substantially the same. Then the contact length formed between the ends of the outer walls 8 of a cooling channel 6 and the flange 4 extends over the outer rim area 11 to the edge 10 of the flange 4.

The stator frame 1 has cooling fins 12 extending outwardly from the outer surface 7 of the stator frame 1 and the cooling fins 12 extend from the first end 2 to the second end 3. The cooling fins 12 extend to the junction area between the flange 4 and the first end 2. The cooling fins 12 extending to the junction area above the upper surface 16 of the flange 4 provide further stiffness to the first end 2 which is the portion of the frame 1 receiving the main loading. The ends of the cooling fins 13 may be chamfered to leave the upper surface 16 of the flange 4 unobstructed.

In the second end 3 the radial height of the cooling fins 12 may be reduced towards the second end 3. The direction of the cooling fins may be directed in a direction which is between the tangential direction of the outer surface 7 and the radial direction.

The cooling fluid channels 6 may be positioned symmetrically in the circumferential direction p of the frame, or with uneven intervals. In the figures the distance in the circumferential direction between the cooling fluid channels 6 is substantially equal between some cooling fluid channels 6 and then substantially unequal between other cooling fluid channels 6.

The stator frame 1 is of cylindrical shape. To increase the stiffness further, the frame 1 may comprise a conical portion. The portion of the frame 14 at the first end 2 may be arranged to widen conically towards the flange 4. The height of the conically widening portion 14 of the stator frame 1 may vary between 4% to 20% of the total height of the stator frame 1 in a length direction L of the frame 1.

The mounting direction of the stator frame is an upright position in the length direction L of the frame 1 the first end 2 being underneath the second end 3.

The stator frame 1 provides a high rotational stiffness. The axial stiffness of the stator frame 1 is particularly important in vertical mounted electrical machines in which the entire mass of the rotor is transferred to the stator frame 1 of the electrical machine.

In the figures shown the number of cooling fluid channels 6 in the stator frame 1 is three. Three cooling fluid channels is a preferable number for an electrical machine in which the whirling of the shaft corresponds to a rotating ellipse as the time proceeds. However, the number of the fluid channels may vary between 3 and 9.

The stator frame 1 may comprise openings for service 15. The opening for service 15 may be positioned adjacent to the flange 4 and be reinforced with a surrounding frame. The surrounding frame may extend over the outer rim area 11 to the edge 10 of the flange 4.

The stator frame 1 is made of cast iron, for instance. Integrally cast flange 4, cooling ducts 6 and cooling fins 12 allow a very rigid mounting and minimal vibration.

In a vertically mounted electrical machine the stator with its electrical parts is installed into the stator frame 1 and the rotor of the electrical machine is installed inside the stator, whereby there is an air gap between the rotor and the stator. The rotor is then fixed to the shaft of the electrical machine and the shaft is supported by bearings to the end shields and of the electric machine. The shaft and the rotor rotates around the axial rotating axis. An end shield is fixed to the second end 3 of the frame 1.

In the electrical machine the cooling fins 12 and the cooling fluid channels 6 of the stator frame 1 extend vertically, i.e. in the direction of the electrical machine's shaft. A cooling fluid channel 6 can also be used as a cable route for passing cables from the connection box of the electric machine to the interior or the exterior of the electric machine. Further, an outer wall of the cooling channel 6 may comprise one or more covered openings for installing cables.

The increased stiffness of the stator frame 1 increases the reed frequency of the stator frame 1 and thus reduces the vibration of the electrical machine. Especially the stator frame 1 reduces a whirl of a shaft of a rotor of an electrical machine excited by the unbalance of the rotor mass.

The electric machine can be an electric motor or an electric generator.

When the electric machine is an electric motor, the work machine or power tool to be driven by the electric motor is connected to the first end 2 of the stator frame 1 and mounted to the flange 4 of the stator frame 1. When the electric machine is an electric generator, the driving machine which drives the electric generator is connected to the first end 2 of the stator frame 1. The first end 2 of stator frame 1 is located to the drive end and the second end 3 of the stator frame 1 is located to the non-drive end of the electric machine.

It will be obvious to a person skilled in the art that, as the technology advances, the inventive concept can be implemented in various ways. The invention and its embodiments are not limited to the examples described above but may vary within the scope of the claims.

Part list: 1 a frame, 2 a first end, 3 a second end, 4 a flange, 5 an opening, 6 a cooling fluid channel, 7 an outer surface, 8 an outer wall, 9 an end of an outer wall, 10 an edge, 11 an outer rim area, 12 a cooling fin, 13 an end of a cooling fin, 14 a portion of the frame, 15 an opening for service, 16 an upper surface.

c centre line, L a length direction, p a circumferential direction, r radial direction, r1 a radial distance.

The invention claimed is:

1. A stator frame of an electrical machine, comprising:
   a cylindrical inner portion having an axial center line, a first axial end, a second opposite axial end, and an outer surface,
   cooling fluid channels extending on the outer surface of the cylindrical inner portion of the stator frame from the first axial end to the second axial end of the cylindrical inner portion of the stator frame,
   cooling fins extending from the first axial end to the second axial end, of the cylindrical inner portion of the stator frame,
   a flange positioned at the first axial end of the cylindrical inner portion of the stator frame and forming a continuous part of the stator frame in order to strengthen the stator frame and in order to give structural stiffness to the stator frame, the flange protruding radially outwards from the outer surface of the cylindrical inner portion of the stator frame, wherein
   the stator frame is formed as a single piece,
   a mounting direction of the stator frame is an upright position in the length direction of the stator frame, the first end of the cylindrical inner portion of the stator frame being underneath the second end of the cylindrical inner portion of the stator frame,
   the cooling fluid channels extend in the radial direction to an outer edge of the flange, axial ends of the outer walls of the cooling fluid channels being connected in a junction to an upper surface of the flange in the first axial end of the cylindrical inner portion of the stator frame, the cooling fluid channels forming a continuous part of the flange, whereby the junction transfers axial forces and torque between the flange and the cooling fluid channels,
   the cooling fins extend outwardly from the outer surface of the cylindrical inner portion of the stator frame, the cooling fins being positioned between the cooling fluid channels, the cooling fins extend to a junction area between the flange and the first axial end of the cylindrical inner portion of the stator frame.

2. The stator frame of an electrical machine according to claim 1, wherein the cooling fluid channels are positioned symmetrically in the circumferential direction of the stator frame.

3. The stator frame of an electrical machine according to claim 2, wherein the number of the cooling fluid channels in the frame is three.

4. The stator frame of an electrical machine according to claim 2, wherein the ends of the radially outmost outer walls of the cooling fluid channels are connected to the flange in the outer rim area.

5. The stator frame of an electrical machine according to claim 2, wherein junctions between the flange and the ends of the outer walls are capable of transferring axial forces and torque.

6. The stator frame of an electrical machine according to claim 2, wherein the frame is of cylindrical shape and comprises a portion of the frame at the first end which is widening conically towards the flange.

7. The stator frame of an electrical machine according to claim 1, wherein the number of the cooling fluid channels in the stator frame is three.

8. The stator frame of an electrical machine according to claim 7, wherein the ends of the radially outmost outer walls of the cooling fluid channels are connected to the flange in the outer rim area.

9. The stator frame of an electrical machine according to claim 7, wherein junctions between the flange and the ends of the outer walls are capable of transferring axial forces and torque.

10. The stator frame of an electrical machine according to claim 7, wherein the frame is of cylindrical shape and comprises a portion of the frame at the first end which is widening conically towards the flange.

11. The stator frame of an electrical machine according to claim 1, wherein the stator frame comprises a portion at the first end of the inner portion of the stator frame which is widening conically towards the flange.

12. The stator frame of an electrical machine according to claim 11, wherein junctions between the flange and the ends of the outer walls are capable of transferring axial forces and torque.

13. The stator frame of an electrical machine according to claim 11, wherein the frame is of cylindrical shape and comprises a portion of the frame at the first end which is widening conically towards the flange.

14. The stator frame of an electrical machine according to claim 1, wherein the thickness of the outer walls of the cooling fluid channels increases towards the first end of the inner portion of the stator frame in a length direction of the stator frame.

15. The stator frame of an electrical machine according to claim 1, wherein the stator frame is made of cast iron.

16. A vertically mounted electrical machine comprising the stator frame as claimed in claim 1.

17. The vertically mounted electrical machine according to claim 16, wherein a power tool is mounted to the flange of the stator frame.

* * * * *